United States Patent [19]

Braun

[11] 3,716,403
[45] Feb. 13, 1973

[54] METHOD OF MAKING SEMI-CONDUCTIVE CATHODES

[75] Inventor: Leon Braun, Linden, N.J.

[73] Assignee: Molecular Energy Corporation, Livingston, N.J.

[22] Filed: Oct. 20, 1969

[21] Appl. No.: 867,922

[52] U.S. Cl.............117/201, 136/120 R, 136/137, 117/100 B, 117/DIG. 6, 252/439
[51] Int. Cl..................................................H01j 9/00
[58] Field of Search......136/120 FC, 120 R; 252/439; 117/100 I, DIG. 6, 100 B, 201

[56] References Cited

UNITED STATES PATENTS

| | | | |
|---|---|---|---|
| 3,198,667 | 8/1965 | Gladrow et al. | 136/122 |
| 719,752 | 2/1903 | Conrad | 136/137 |
| 796,949 | 7/1915 | de Mello | 136/137 |
| 3,554,802 | 1/1971 | Brown et al. | 136/120 R |
| 2,865,868 | 12/1958 | McKinley et al. | 252/467 |
| 2,042,306 | 5/1936 | Haslam | 252/439 X |
| 3,275,567 | 9/1966 | Keith et al. | 252/439 |
| 3,492,164 | 1/1970 | Wolfe, Jr. | 136/86 |
| 2,376,223 | 5/1945 | Bender | 252/439 |
| 3,450,570 | 6/1969 | Root | 136/120 R |

*Primary Examiner*—Winston A. Douglas
*Assistant Examiner*—M. J. Andrews
*Attorney*—Frank M. Nolan

[57] ABSTRACT

The cathodes produced by the methods of this invention have relatively good conductivity and have a high proportion of energy productive materials and a significantly low proportion of non-energy productive materials. The method of producing such cathodes involves coating particles of metallic halides or oxides of copper, nickel, iron, silver or lead with a metallic sulfide and locating a plurality of the resulting coated particles so that substantially each coated particle of the plurality contacts at least one other coated particle of such plurality.

16 Claims, No Drawings

A METHOD OF MAKING SEMI-CONDUCTIVE CATHODES

This invention relates to semi-conductive cathodes of a battery and to the methods of producing such cathodes.

The depolarizing materials employed in the manufacture of cathodes of batteries usually have poor conductivity characteristics. But in order to have an efficient cathode system conductivity should be as high as possible. Heretofore, the increase in conductivity has been achieved by the addition of highly conductive, non-energy productive materials such as carbon, graphite and metal particles. As a consequence, the proportion of non-energy productive materials in the cathode is increased at the expense of a significant diminution of the proportion of the energy productive materials.

In accordance with this invention, relatively good conductive cathodes are produced with a high proportion of the cathode comprising energy productive materials and a significantly low proportion of non-energy productive materials. Such cathodes are produced by coating particles of a metallic halide or oxide with a metallic sulfide. The metal of the halide, oxide or sulfide may be copper, nickel, iron, silver or lead. The halide may be a fluoride, chloride, bromide or iodide. The sizes of the particles of the metallic halide or oxide desirably are within the range from 16 mesh to 400 mesh and preferably from 50 mesh to 100 mesh. In all of the methods the desired coating results from a direct chemical reaction or from a direct coating. Particle size of the metallic halide or oxide is obtained by conventional methods such as milling or grinding.

The coating of the particles may be accomplished conveniently by contacting the particles with a sulfide dissolved in a solvent in which the particles and the coated metallic sulfide are insoluble. Convenient solvents for the sulfide employed to effect the coating are ethyl alcohol, methyl alcohol, carbon bisulfide, water or glycerine. The sulfide employed for producing the metallic sulfide coating on the particles may advantageously be an alkali metal sulfide or ammonium sulfide. The alkali metal sulfide may be, for example, sodium sulfide, potassium sulfide or lithium sulfide. The particles of metallic halide or oxide may be in suspension in a gaseous medium and sprayed with a solution of a soluble metallic sulfide such as sodium sulfide.

Another method of effecting the coating of the particles of the metallic halide or oxide is to tumble them in a dry state in a blender while spraying. Still another method in which the particles of the metallic halide or oxide are suspended in a gaseous medium is to subject the suspension to sulfur in a molten or vaporized state.

The thickness of the coating of the metallic sulfide on the particles of the metallic halide or oxide is effected by controlling the ratio of metallic halide to metallic sulfide employed for effecting the coating. That ratio is desirable within the range of 4 to 1 and 50 to 1.

For certain applications, the coated particles may be placed in a container and used as the depolarizer. The coated particles may remain in an unbonded but compressed condition, and conductivity being effected primarily through the contact of the coating of one particle with that of another. Again, the coated particles could be bound together by a conductive or non-conductive binder. For example, coated particles may be bound together with sulfur or a mixture of sulfur and any of the metallic sulfides employed as a coating material and then subsequently pressed and heated to a temperature, for example, in the range of 200° to 400°F. An organic binder such as a plastic, for example, polyvinyl chloride or polyethylene, may be employed to bind the coated particles. The coated particles may be mixed with about 1 to 10 percent of thermoplastic material and then pressed and heated to a temperature of approximately 240°F.

A more comprehensive understanding of this invention is obtained by reference to the following examples.

EXAMPLE I

500 G. of cupric fluoride particles of approximately 50 to 100 mesh are suspended in 1,000 ml. of methyl alcohol. To the suspension are added 50 g. of sodium sulfide dissolved in 1,500 ml. of ethyl alcohol. The sodium sulfide solution is added slowly to the cupric fluoride suspension which is simultaneously stirred. The resulting mixture is then rinsed and dried thereby leaving a residue of copper fluoride coated with copper sulfide. The material is conductive electrically. Material obtained may be mixed with approximately 3 percent of polyvinyl chloride thermoplastic material and thoroughly mixed, placed on a metallic 20 mesh screen and pressed at a temperature of approximately 300°F for a few minutes and then removed. The resulting element is a hard, self-supporting plate which is electrically conductive and serves as a high density cathode. The elements when tested show densities as high as 5 amperes per square inch at useful voltages as high as 1.7 volts at 500 amperes per square inch, when using magnesium as the anode electrode.

If desired the ratio of components, time of mixing and temperature of mixing may be varied to change the thickness of the coating and thus the conductivity of the system. For higher current discharge systems there would be a much thicker coating to obtain high conductivity.

EXAMPLE II

To obtain an electro negative element comprising particles of silver chloride coated with silver sulfide, the procedure described in Example I is followed except that 520 g. of finely divided silver chloride of range of particle size of 50 to 100 mesh is employed instead of the 500 g. of cupric fluoride. There is thereby obtained a high conductivity system with silver chloride as the depolarizing material without the necessity of silver plating or silver coating the finished product.

EXAMPLE III

The same technique described in Example I may be followed on an essentially dry basis by using a blender such as a Ferguson Blender, sometimes called a Tincone blender, in which copper fluoride is placed in the blender in a dry condition and treated with an aqueous solution of sodium fluoride. The solution of sodium sulfide is sprayed on the copper fluoride particles as the system rotates. By controlling the time and temperature for a period of four to five minutes and spraying the aqueous solution of sodium sulfide, coated copper fluoride particles are obtained similar to those resulting from the practice of Example I.

EXAMPLE IV

The procedure in Example III is followed except that 500 g. of nickel fluoride of 50 to 100 mesh is placed in a Ferguson Blender and treated with an aqueous solution of sodium sulfide as the system is rotating. The resulting nickel sulfide coating produced becomes the conductive material and the excess sodium sulfide is rinsed away. The coated particles are mixed with a binder such as polyethylene or polyvinyl chloride and pressed to form the final semi-conductive electrode.

EXAMPLE V

The procedure followed in Example II is followed except that 750 g. of lead dioxide is used instead of 520 g. of silver chloride. The particle size of the lead dioxide is 50 to 100 mesh. The resulting coated particles may be inserted in a lead grid mesh and utilized as an electronegative electrode.

What is claimed is:

1. The method of producing a semiconductive cathode of a battery comprising coating particles of a metallic halide or oxide with a metallic sulfide, said metallic halide, oxide or sulfide being selected from the class consisting of halides, oxides and sulfides of copper, nickel, iron, silver and lead, said coating being effected by contacting the uncoated particles with a soluble sulfide dissolved in a solvent in which said uncoated and the resulting coated particles are insoluble, said uncoated particles being suspended in a gaseous medium and being sprayed with said soluble sulfide dissolved in said solvent.

2. The method of claim 1 in which said soluble sulfide is an alkali metal sulfide or ammonium sulfide.

3. The method of claim 1 in which the solvent is methyl alcohol, ethyl alcohol, carbon bisulfide, water or glycerine.

4. The method of claim 1 in which the resulting metallic sulfide coated particles are compressed.

5. The method of claim 1 in which the ratio by weight of said metallic halide or oxide to said metallic sulfide is within the range of 4 to 1 and 50 to 1.

6. The method of producing a semiconductive cathode of a battery comprising substantially uniformly coating particles of a metallic halide or oxide with a metallic sulfide, said metallic halide, oxide or sulfide being selected from the class consisting of halides, oxides and sulfides of copper, nickel, iron, silver and lead, by contacting said particles with a soluble sulfide dissolved in a solvent in which the uncoated particles and the resulting coated particles are insoluble, and controlling the thickness of the coating by maintaining the ratio of said particles to metallic sulfide within the range of 4 to 1 and 50 to 1.

7. The method of claim 6 in which the uncoated particles are suspended in said solvent.

8. The method of claim 6 in which said soluble sulfide is an alkali metal sulfide or ammonium sulfide.

9. The method of claim 6 in which the solvent is methyl alcohol, ethyl alcohol, carbon bisulfide, water or glycerine.

10. The method of claim 6 in which the resulting metallic sulfide coated particles are compressed.

11. The method of claim 6 in which the particles coated are of a metallic halide.

12. The method of claim 6 in which the halide, oxide or sulfide is a halide, oxide or sulfide of copper.

13. The method of claim 6 in which the halide, oxide or sulfide is a halide, oxide or sulfide of nickel.

14. The method of claim 6 in which the halide, oxide or sulfide is a halide, oxide or sulfide of iron.

15. The method of claim 6 in which the halide, oxide or sulfide is a halide, oxide or sulfide of silver.

16. The method of claim 6 in which the halide, oxide or sulfide is a halide, oxide or sulfide of lead.

* * * * *